June 8, 1965   K. P. A. EURENIUS   3,188,553
TEMPERATURE CONTROL SYSTEM
Filed Dec. 5, 1961   4 Sheets-Sheet 1

INVENTOR KARL PETRUS ARNE EURENIUS
HIS ATTORNEYS

INVENTOR KARL PETRUS ARNE EURENIUS

June 8, 1965 K. P. A. EURENIUS 3,188,553
TEMPERATURE CONTROL SYSTEM
Filed Dec. 5, 1961 4 Sheets-Sheet 4

INVENTOR KARL PETRUS ARNE EURENIUS
BY Cushman, Darby & Cushman
HIS ATTORNEYS

United States Patent Office 3,188,553
Patented June 8, 1965

3,188,553
TEMPERATURE CONTROL SYSTEM
Karl Petrus Arne Eurenius, Solna, Sweden, assignor to Regulator A.G., Glarus, Switzerland, a company of Switzerland
Filed Dec. 5, 1961, Ser. No. 157,234
Claims priority, application Sweden, Dec. 6, 1960, 11,789/60
4 Claims. (Cl. 323—69)

The present invention relates to a system for temperature control, particularly in connection with heating and ventilation of buildings, and refers especially to a temperature control system for summer-winter compensation.

When controlling temperature, the feeler device often used is a temperature-dependent resistance connected in a measuring bridge which via an amplifier actuates relays for the operation of a motor-driven valve, a cooling machine, a damper or electrical heating batteries, which influence the temperature in the controlled space where the temperature-dependent resistance is placed.

In other branches of the measuring bridge or in separate bridges connected in series or in parallel with the measuring bridge, other temperature-dependent resistances, compensators, can be connected, the purpose of which can be to displace the regulation point which has been set. Thus, an outdoor compensator can, for instance, be used to regulate the temperature in a room, in order to raise the temperature during the cold season, thus providing compensation for heat emitted through windows and for cold walls.

Also during the summer, however, it can be considered desirable to raise the indoor temperature, as a too great drop from a high outdoor temperature to a colder room cannot be considered comfortable for persons coming in from outdoors.

Figure 1:
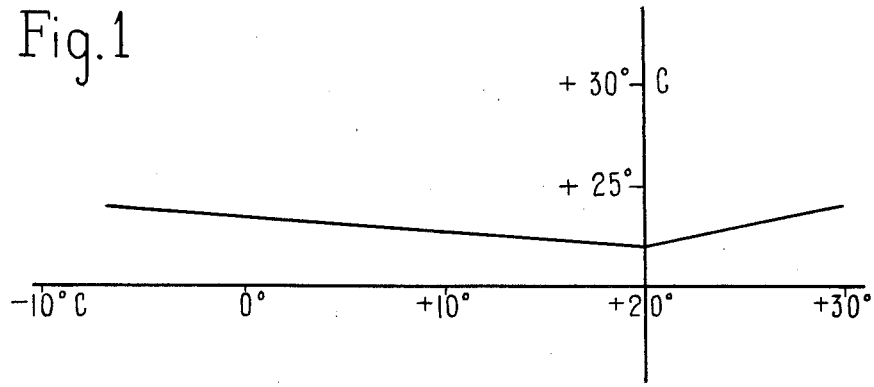
Figure 2:
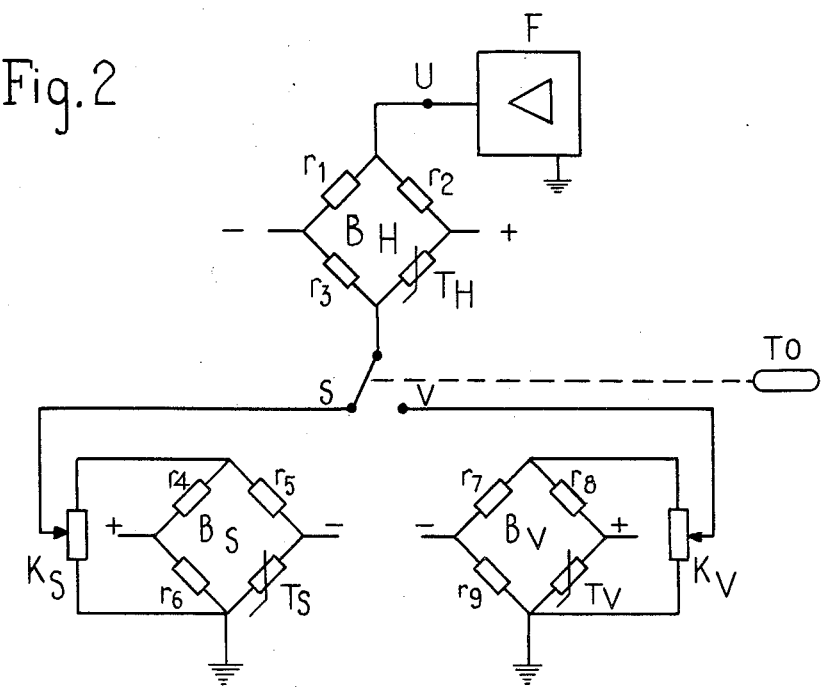
Figure 3:
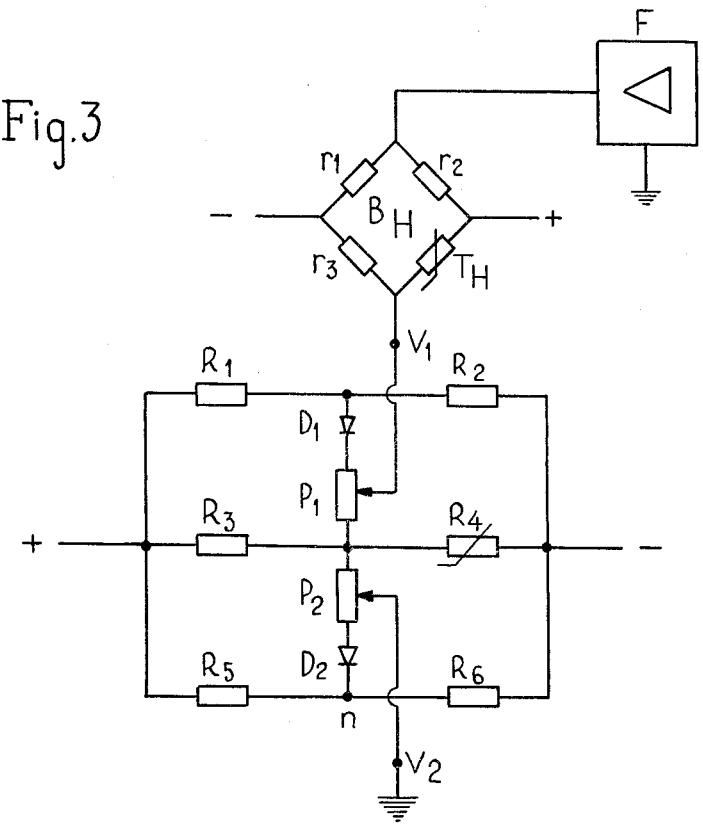
Figure 4:
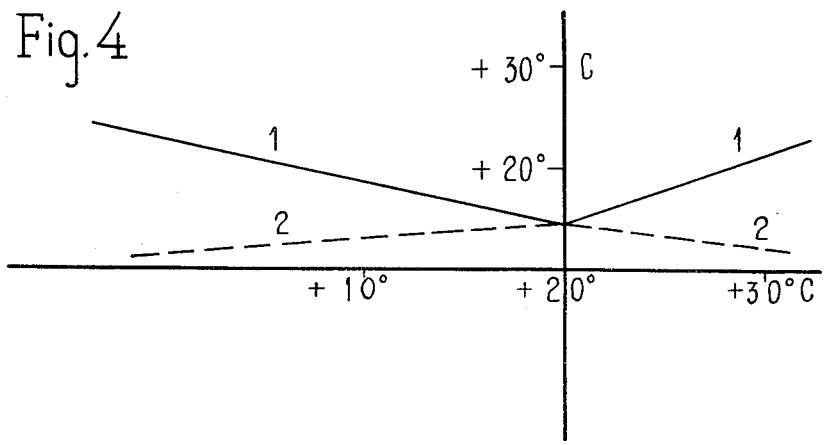
Figure 5:
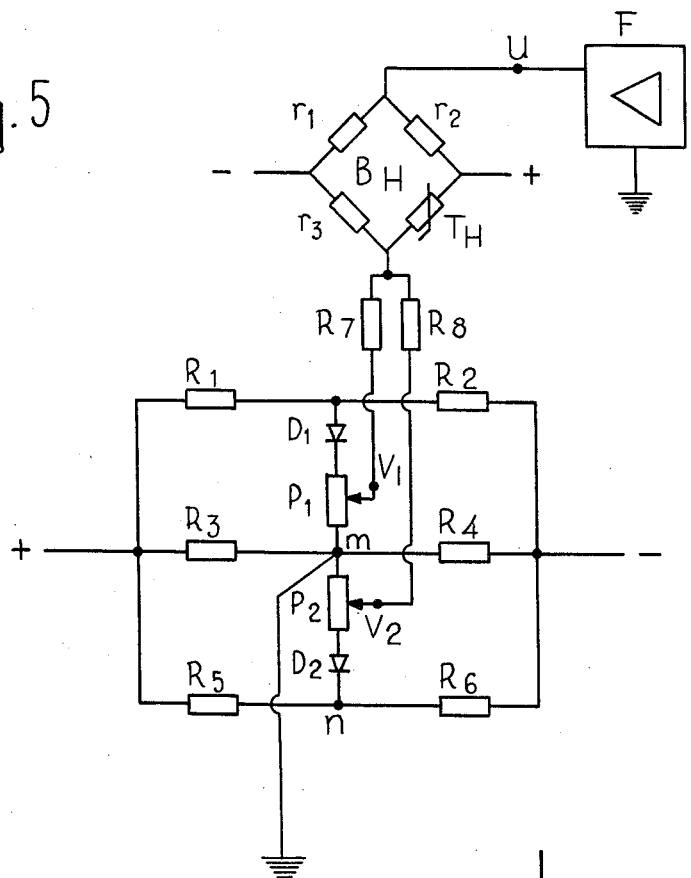
Figure 6:
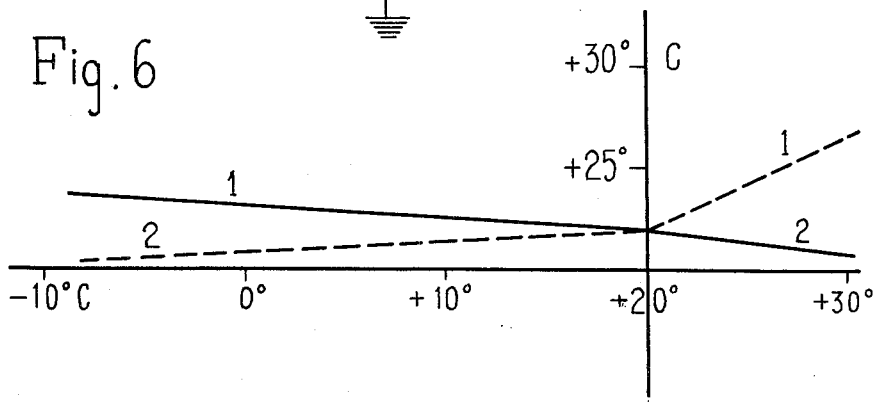
Figure 7:
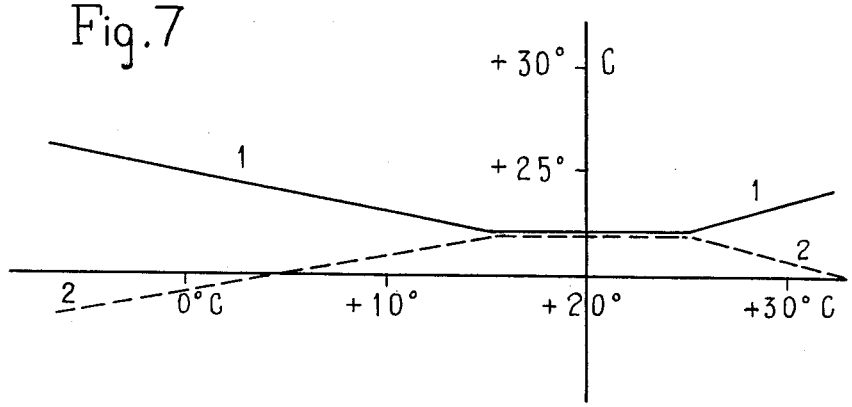
Figure 8:
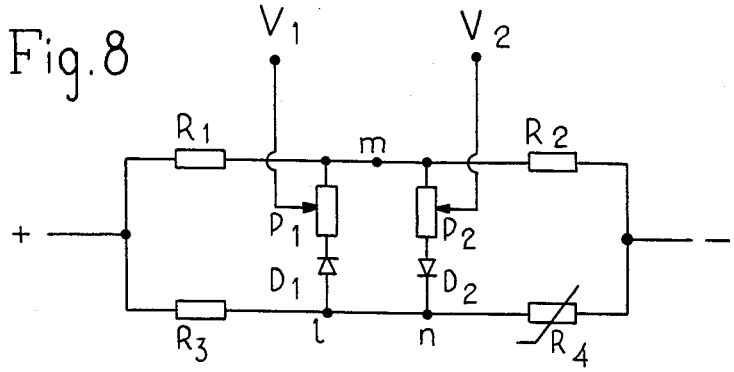
Figure 9:
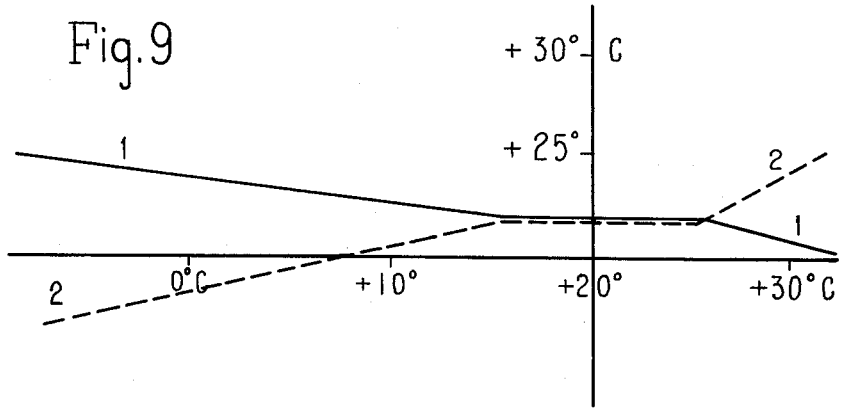

The invention will be described in more detail with reference to the attached drawings, in which FIG. 1 is a curve according to which the indoor temperature can be desired to vary with the outdoor temperature, FIG. 2 shows a previously known device for obtaining a temperature variation according to FIG. 1, FIG. 3 shows an embodiment of the invention, FIG. 4 shows the regulating curve obtained with the embodiment according to FIG. 3, FIG. 5 shows another embodiment according to the invention, FIG. 6 shows the regulating curve which is obtained with the device according to FIG. 5, FIG. 7 shows another possible regulating curve, FIG. 8 shows a further, modified embodiment of a device according to the invention, and FIG. 9 shows still another possible form of the regulating curve.

A system of measuring bridges for obtaining a function according to FIG. 1 can be built up according to FIG. 2. The indoor thermostat $T_H$ is connected in the measuring bridge $B_H$ having the resistors $r_1$, $r_2$ and $r_3$. The outdoor thermostat $T_S$ is connected in the measuring bridge $B_S$ having the resistors $r_4$, $r_5$ and $r_6$, and the outdoor thermostat $T_V$ is connected in the measuring bridge $B_V$ having the resistors $r_7$, $r_8$ and $r_9$. The bridge $B_H$ is balanced at a room temperature of $+22°$ C., and the bridges $B_S$ and $B_V$ are balanced at an outdoor temperature of $+20°$ C. $T_0$ is a switching thermostat (e.g. bimetal or steam-pressure actuated) subjected to the influence of the outdoor temperature. The outdoor temperaure at which the switching takes place is $+20°$ C. Thus, at temperatures above $+20°$ C. the switch is in position S and at temperatures below $+20°$ C. in position V. In FIG. 2, the temperature-dependent thermistors $T_H$, $T_S$ and $T_V$ have moreover been assumed to have a negative temperature coefficient. At too low temperatures at $T_H$, U thus obtains a positive potential. The polarity-sensitive amplifier is intended to be connected in such a way that when there is a positive potential at U it actuates the control device in such a way that the temperature at $T_H$ increases.

If now the outdoor temperature is $+20°$ C. and $T_0$ is in position S, no output voltage is obtained from the bridge $B_S$. The thermostat $T_H$ then alone determines the voltage U, which actuates the amplifier and, accordingly, the regulating procedure. When the outdoor temperature increases, an output voltage proportional to the increase is obtained from the bridge $B_S$. This output voltage actuates the control devices, via the amplifier, in such a direction that the temperature at $T_H$ increases. When the temperature $T_H$ has increased to a certain value, the output voltage from $B_H$ has become so great that the sum of the voltage from $B_H$ and $B_S$=0. It can also be said that the output voltage from $B_S$ has displaced the regulating point of $T_H$. As the output voltage from $B_S$ increases when the temperature rises, the temperature at $T_H$ rises with the outdoor temperature. The degree of temperature increase is determined by the setting of the potentiometer $K_S$.

In the same way, a displacement of the regulating point of $T_H$ can take place when the outdoor temperature falls below $+20°$ C., as $T_0$ has moved the switch to position V and the bridge $B_V$ is connected in series with the bridge $B_H$.

The present invention relates to an improvement of such regulating systems and is characterized essentially by the provision of a bridge device fed with direct current to its input terminals, which bridge contains a feeler device, the resistance of which can be influenced by external physical regulating magnitudes, and two circuits, each containing an unidirectionally conducting element and a resistance element, a change in the resistance of the feeler device in one direction then causing such a distribution of the potential within the bridge that either of the said circuits becomes conducting to generate a control signal.

An embodiment of the invention is shown in FIG. 3, where it is assumed that $$\frac{R_1}{R_2}=\frac{R_3}{R_4}=\frac{R_5}{R_6}$$

(balanced bridge). The potentials at terminals $l$, $m$ and $n$ are then equal and, accordingly, no current flows through $P_1$ and $P_2$ and the voltage $V_1-V_2$ is 0. If now the resistance of $R_4$ is decreased, $m$ obtains a negative potential in relation to $l$ and $n$. Current will then flow through $D_1$ and $P_1$, but not through $D_2$ and $P_2$, as the diode $D_2$ blocks. The more $R_4$ is decreased, the greater the voltage $V_1-m$ will be, and the degree of increase is determined by the setting of the potentiometer $P_1$.

It will be realised that if $R_4$ is increased above the balance value, the potential at $m$ will be positive in relation to $l$ and $n$. Current will now flow through $P_2$ and $D_2$, but not through $P_1$ and $D_1$, and the output voltage will be determined by the potentiometer $P_2$.

As the figure is drawn, $V_1$ thus obtains a positive potential in relation to $V_2$ if the resistance $R_4$ is above or below a certain value.

When connected in series with another measuring bridge, the bridge connection described will thus raise the regulating point of this measuring bridge as well when $R_4$ is below as above a certain resistance value. See the curve drawn with a solid line in FIG. 4.

On the other hand, if $V_1$ and $V_2$ are shifted, the regulating point will be lowered both when $R_4$ is below and above the said resistance value. See the dashed line in FIG. 4.

If, when $R_4$ goes above a certain value, it is desired to obtain a lowering of the regulating point of a series-connected measuring bridge and when $R_4$ goes below a certain value it is desired to obtain a raising of a regulating point the connection is made according to FIG. 5. When $R_4$ goes below a certain value, current flows through $P_1$, and V then obtains a positive potential, i.e. the temperature at $T_H$ is raised, but when $R_4$ goes above a certain value, current flows through $P_2$ in such a direction that V obtains a negative potential, i.e. the temperature $T_H$ decreases. A programme according to the dashed line in FIG. 6. is obtained.

On the other hand, if the polarity of the current feed of the double bridge is shifted, a programme according to the solid line in FIG. 6 is obtained.

If, in FIG. 3, $$\frac{R_1}{R_2} > \frac{R_5}{R_6}$$

it is obvious that no current will flow through either $P_1$ or $P_2$ within a certain interval of the resistance $R_4$. The displacement of the regulating point will thus take place according to FIG. 7, curves 1 or 2, depending upon how the voltage $V_1 - V_2$ is connected.

If, in FIG. 5, $$\frac{R_1}{R_2} > \frac{R_5}{R_6}$$

a temperature interval is obtained in the same way, where $R_4$ does not displace the regulating point of $T_H$, i.e. a temperature programme according to FIG. 9, curves 1 or 2, depending upon the polarity of the current feed to the double bridge.

In cases when in FIGS. 3 and 5

$$\frac{R_1}{R_2} = \frac{R_5}{R_6}$$

the bridge can be further simplified according to FIG. 8. In this embodiment diodes $D_1$ and $D_2$ are connected in parallel circuits, the anode of one diode being connected to the cathode of the other. The description given above in regard to FIG. 3 and FIG. 5 for obtaining the programmes according to FIG. 4 and FIG. 6, respectively, can be applied directly to this connection.

Although the description given above has been referred to the regulation of temperature, it is obvious that the device can be applied to the regulation of other magnitudes (for instance humidity) which influence the resistance of a feeler device. Moreover, when regulating a magnitude, for instance humidity, the regulating point can be displaced by another magnitude, for instance temperature.

I claim:

1. In a control system, a circuit responsive to the magnitude of a quantity such as temperature to provide a control signal, said circuit comprising a measuring bridge, said bridge having input terminals and additional terminals at which the balance of said bridge is determined, said bridge further including means responsive to the quantity being measured for controlling the balance of the bridge, unidirectionally conducting means connected between said additional terminals, said unidirectionally conducting means comprising a pair of diodes connected in series, said responsive means being joined between one of said input terminals and a point intermediate said diodes whereby unbalance of the bridge in one sense causes one of said diodes to conduct and unbalance in the other sense causes the second diode to conduct, said unidirectionally conducting means being operative during unbalanced conditions of said bridge to conduct thereby providing a control signal for the control system.

2. In a control system, a circuit responsive to the magnitude of a quantity such as temperature to provide a control signal, said circuit comprising a measuring bridge, said bridge having input terminals and additional terminals at which the balance of said bridge is determined, said bridge further including means responsive to the quantity being measured for controlling the balance of the bridge, unidirectionally conducting means connected between said additional terminals, said unidirectionally conducting means comprising a pair of diodes connected in parallel, the anode of one diode being joined to the cathode of the other whereby unbalance of the bridge in one sense causes one of said diodes to conduct and unbalance in the other sense causes the second diode to conduct, said unidirectionally conducting means being operative during unbalanced conditions of said bridge to conduct thereby providing a control signal for the control system.

3. In a control system, a circuit responsive to the magnitude of a quantity such as temperature to provide a control signal, said bridge having input terminals and additional terminals at which the balance of said bridge is determined, said bridge further including means responsive to the quantity being measured for controlling the balance of the bridge, a series circuit including resistance means and unidirectionally conducting means connected between said additional terminals, said unidirectionally conducting means comprising a pair of diodes connected in series, said responsive means being joined between one of said input terminals and a point intermediate said diodes whereby unbalance of the bridge in one sense causes one of said diodes to conduct and unbalance in the other sense causes the second diode to conduct, said unidirectionally conducting means being operative during unbalanced conditions of said bridge to conduct thereby providing a control signal at said resistance means for the control system.

4. In a control system, a circuit responsive to the magnitude of a quantity such as temperature to provide a control signal, said circuit comprising a measuring bridge, said bridge having input terminals and additional terminals at which the balance of said bridge is determined, said bridge further including means responsive to the quantity being measured for controlling the balance of the bridge, a series circuit including resistance means and unidirectionally conducting means connected between said additional terminals, said unidirectionally conducting means comprising a pair of diodes connected in parallel, the anode of one diode being joined to the cathode of the other, and said resistance means comprising a resistor in series with each of said diodes, said circuit being operative such that unbalance of the bridge in one sense causes one of said diodes to conduct thereby generating a control signal at its respective resistor, and unbalance of the bridge in the other sense causes the second diode to conduct thereby generating a control signal at its respective resistor, said unidirectionally conducting means being operative during unbalanced conditions of said bridge to conduct thereby providing a control signal at said resistance means for the control system.

References Cited by the Examiner

UNITED STATES PATENTS

| 2,745,053 | 5/56 | Meyer | 323—69 |
| 2,781,505 | 2/57 | Grant | 323—75 |
| 2,801,388 | 7/57 | Rage | 323—69 |
| 2,917,702 | 12/59 | Steghart et al. | 323—69 |

LLOYD McCOLLUM, *Primary Examiner.*